United States Patent Office 3,109,836
Patented Nov. 5, 1963

3,109,836
PROCESS FOR PRODUCING AROMATIC POLYAMIDES FROM ACETAMIDOBENZOIC ACIDS
David A. Berry, Columbus, Ohio, assignor, by mesne assignments, to Esso Research and Engineering Company, Linden, N.J., a corporation of Delaware
No Drawing. Filed Dec. 31, 1959, Ser. No. 863,084
5 Claims. (Cl. 260—78)

This invention relates to a new class of aromatic polyamides. More particularly, the present invention is directed to a new class of thermoplastic resonant aromatic polyamides of superior heat stability.

There is a need for thermally stable thermoplastic polymers. Such polymers find utility in areas where extremely high temperatures are encountered, such as rocket nose cones, etc. In accordance with the present invention, a new class of thermally stable aromatic polyamides is provided for utilization in such areas.

Briefly, the polymers of the present invention are polymers formed from an acetamidobenzoic acid or from $C_1$ to $C_4$ alkyl substituted acetamidobenzoic acid. Thus, the polymers of the present invention may be prepared from ortho-, meta-, or para-acetamidobenzoic acid, as represented by the following structural formulae:

(I) 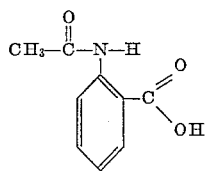

(II) 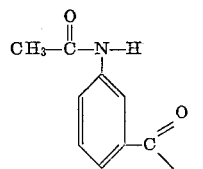

(III) 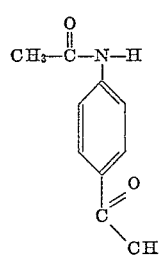

Also, one or a plurality of $C_1$ to $C_4$ ring substituted alkyl acetamidobenzoic acids may be used as monomers or comonomers. Mixtures of unsubstituted and $C_1$ to $C_4$ ring substituted alkyl acetamidobenzoic acids may also be used.

The polymers of the present invention are simply prepared by thermal polymerization at a temperature in excess of about 200° C. Normally, there is no need to employ a polymerization catalyst. A preferred temperature range for polymerization is within the range of about 200° to about 300° C. The polymers are formed by a condensation reaction leading to the formation of a linear polyamide and to the formation of by-product acetic acid.

In accordance with a preferred form of the present invention, the polymerization reaction is conducted at subatmospheric pressure, such as a pressure within the range of about 3 to 50 millimeters of mercury in order that the by-product acetic acid may be stripped from the reaction mixture as it is evolved.

The invention will be further illustrated by the following specific examples which are given by way of illustration and not as limitations on the scope of this invention.

Example I

Charge 100 grams of ortho-acetamidobenzoic acid to a reaction flask interconnected with appropriate agitating means and a vacuum connection. Heat the flask to a temperature within the range of about 230° to about 250° over a three hour period while maintaining a pressure of about 5 millimeters of mercury and continue to hold the reaction mixture at this temperature and pressure for an additional 4 hours. At the end of that time, cool the flask to room temperature and recover the polymer.

The polymer is a white, colorless thermoplastic material which may be heated in an open flame to a temperature of about 400° C. without decomposition. When heated above 400° C. in an open flame, however, the material will melt with decomposition.

Example II

Repeat Example I, charging, in this instance, however, 100 grams of meta-acetamidobenzoic acid.

As in the case of Example I, the polymer formed from meta-acetamidobenzoic acid is thermoplastic and may be molded under heat and pressure. It may be heated in an open flame to temperatures up to about 400° C. without decomposition but will melt with decomposition at temperatures above 400° C.

Example III

Repeat Example I but, in this instance, charge 100 grams of para-acetamidobenzoic acid.

The crystalline polymer from this reaction has outstanding thermal properties. When heated in an open flame to a temperature of 700° C., there will be no decomposition. The absence of any decomposition at 700° C. indicates that the polymer may be heated to even higher temperatures without thermal decomposition.

Example IV

Repeat Example I charging a mixture of equimolar proportions of ortho- and meta-acetamidobenzoic acid. Again, a thermoplastic thermally stable polymer is formed, the polymer in this instance being a copolymer formed from ortho- and meta-acetamidobenzoic acid. This is likewise the case when 2-acetamido-5-methylbenzoic acid is treated in the described fashion. Other alkyl substituted acetamidobenzoic acids such as 2-acetamido-4,5-dimethylbenzoic acid, 3-acetamido-5-ethylbenzoic acid may also be treated in this fashion.

It is obvious from the foregoing examples that the polymerization reaction has been accomplished without the introduction of a catalyst into the reactors.

I claim:
1. A method of producing a polymer of acetamidobenzoic acid which consists of heating said acetamido- benzoic acid alone for about 3 hours at 200° to 300° C. and at 3 to 50 mm. of mercury pressure.

2. The method of claim 1 further comprising the step of continuously removing acetic acid evolved during the condensation reaction.

3. A method in accordance with claim 1 wherein the acetamidobenzoic acid is meta-acetamidobenzoic acid.

4. A method in accordance with claim 1 wherein the acetamidobenzoic acid is para-acetamidobenzoic acid.

5. A method of producing a linear copolymer which consists of heating equimolar proportions of ortho-acetamidobenzoic acid and meta-acetamidobenzoic acid alone under subatmospheric pressure and at a temperature from about 200° C. to about 300° C. for a period of about three hours.

References Cited in the file of this patent
UNITED STATES PATENTS

| | | |
|---|---|---|
| 2,642,456 | Emerson et al. | June 16, 1953 |
| 2,688,011 | Wheatley et al. | Aug. 31, 1954 |

OTHER REFERENCES

Chem. Abstracts: 49, 8665h (1955), an abstract of an article by Hasegawa, Bull. Chem. Soc. Japan, 27, pp. 327–330 (1954).